H. H. VAUGHAN.
RAILWAY TRUCK.
APPLICATION FILED JAN. 24, 1906.

917,979.

Patented Apr. 13, 1909.
7 SHEETS—SHEET 5.

H. H. VAUGHAN.
RAILWAY TRUCK.
APPLICATION FILED JAN. 24, 1906.

917,979

Patented Apr. 13, 1909.
7 SHEETS—SHEET 6.

UNITED STATES PATENT OFFICE.

HENRY HAGUE VAUGHAN, OF MONTREAL, QUEBEC, CANADA.

RAILWAY-TRUCK.

No. 917,979.  Specification of Letters Patent.  Patented April 13, 1909.

Application filed January 24, 1906. Serial No. 297,664.

*To all whom it may concern:*

Be it known that I, HENRY HAGUE VAUGHAN, of the city of Montreal, Province of Quebec, Canada, have invented certain new and useful Improvements in Railway-Trucks; and I do hereby declare that the following is a full, clear, and exact description of the same.

This invention relates to an improved form of two wheeled truck for locomotives and similar vehicles, and is especially adapted for use on locomotives of what are generally known as the Atlantic or Pacific type in which a pair of carrying wheels is used under the fire-box. The requirements to be fulfilled in such a truck are that the wheels, axle and axle boxes shall be allowed a lateral movement relatively to the frame of the engine preferably so restricted that in the movement laterally the center line of the axle remains tangent to a circle whose center is located on a line intersecting the center of the axle at right angles to its longitudinal axis. It is also desirable that a resistance should be offered to the lateral displacement of the axle boxes in order to prevent the engine and frame from moving freely over them and to enable them to exert a guiding effect on the engine and restrict its horizontal oscillation when moving along a straight track and to assist in bringing its axis parallel with the track when passing from curved track to straight. In previous designs this lateral resistance has been approximately proportional to the lateral displacement, increasing as the displacement increases, thus affording the minimum returning force when the displacement is small and the greatest when it is large. This action is not desirable on engines of the type to which my invention has particular reference in which the maximum resistance is required when the engine is moving along a straight track and the minimum when rounding a curve.

The invention may be said briefly to consist of a laterally movable cross-head resistance mechanism between the axle box and cross-head, and guiding mechanism carried by the body frame of the vehicle and adapted to guide the axle box and cross-head in their respective movements. For full comprehension, however, of my invention reference must be had to the accompanying drawings forming a part of this specification in which similar reference characters indicate the same parts and wherein—

The axles are indicated at 1, the axle-boxes at 2, the bearings contained in the axle-boxes at 3, and the wheels at 4 while the frame of the vehicle is indicated at 5. These parts are in the main constructed and arranged as formerly.

The features of my invention are the axle box adapted to be movable horizontally, a cross-head movable vertically, means adapted to exert a varying resistance to the movements of the axle-box and cross-head, and means for guiding the said axle-box and cross-head in their movements.

In order to enable the axle box to move relatively to the body-frame of the vehicle I increase the same in width and form the sides thereof with vertical faces 10 curved horizontally on a center coincident with the center of oscillation of the engine or other vehicle to which it is applied, and consequently located on a line intersecting the center of the axle at right angles to the axis thereof.

A pair of oblong cavities 16 and 17 are formed in the top of the axle box in parallel planes and one adjacent and parallel to each of the faces 10, while the bottom corners thereof are adapted to present sockets 18, 100 18$^a$ and 19, 19$^a$. These faces 10 coact with guiding members consisting of a pair of vertical jaws 12 and 13 of which each is equal in vertical measurement to the axle box and one (12) is of obtuse angular cross-section 105 and the other (13) acute angular cross-section each being braced by transverse webs, while the faces 12$^a$ and 13$^a$ of these jaws adjacent to the axle box are curved to conform to the faces 10 and their upper ends terminate in vertical box-like guides 14 and 15 respectively, having their adjacent sides open.

These guiding members are secured preferably by bolts 16 to the vehicle frame one at each side of the axle box and in positions to have their curved faces concentric and in bearing relation to the faces 10. This construction and arrangement of parts allows the axle-box to be displaced, relatively to the frame of the engine or other vehicle, in a direction curved horizontally on a center coincident with the center of oscillation of the said engine or other vehicle.

The cross-head above mentioned is located above the axle-box and consists of an oblong casting presenting a pair of diagonal sockets 25 and 26 respectively in its underside and coinciding with the respective cavities 16 and 17, a pair of diminished ends 27 located slidably in the vertical guides 14 and 15, and a square recess 28 in its top and centrally thereof. This cross head is free to slide vertically in, and is retained against other displacement by its guides 14 and 15.

The required variable resistance to the horizontal movement of the axle box relatively to the cross-head is provided by this cross-head and the weight of the vehicle frame transmitted thereto through the usual leaf spring 30 (the retaining collar 31 whereof is sunk into the square recess 28) and a pair of oscillatory triangular struts 32 and 33, bearing at their apices, which are rounded, in the respective sockets 25 and 26 and at the corners of their bases (such corners being also rounded) in the respective sockets 18, 18ª and 19, 19ª. The strut 32 is of greater height than 33 to compensate the difference in radius, and accommodate the greater oscillation. The ends of the spring are pivotally connected to the vehicle frame as usual by hangers 40.

Figure 7:
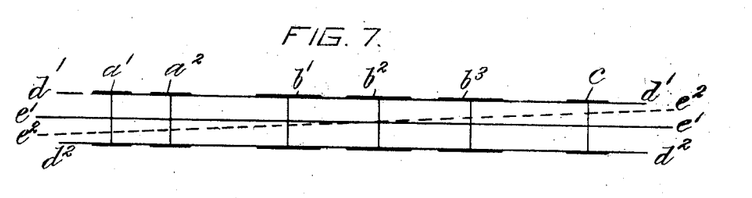
Figs. 7 and 8 are diagrammatical views illustrating the relative positions of the wheels and body of a vehicle, while running along a straight piece of track and rounding a curve, respectively.
Figure 8:
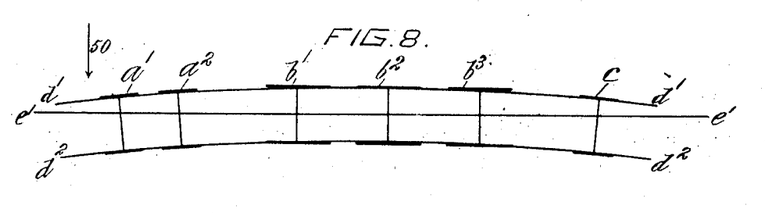
Figure 9:
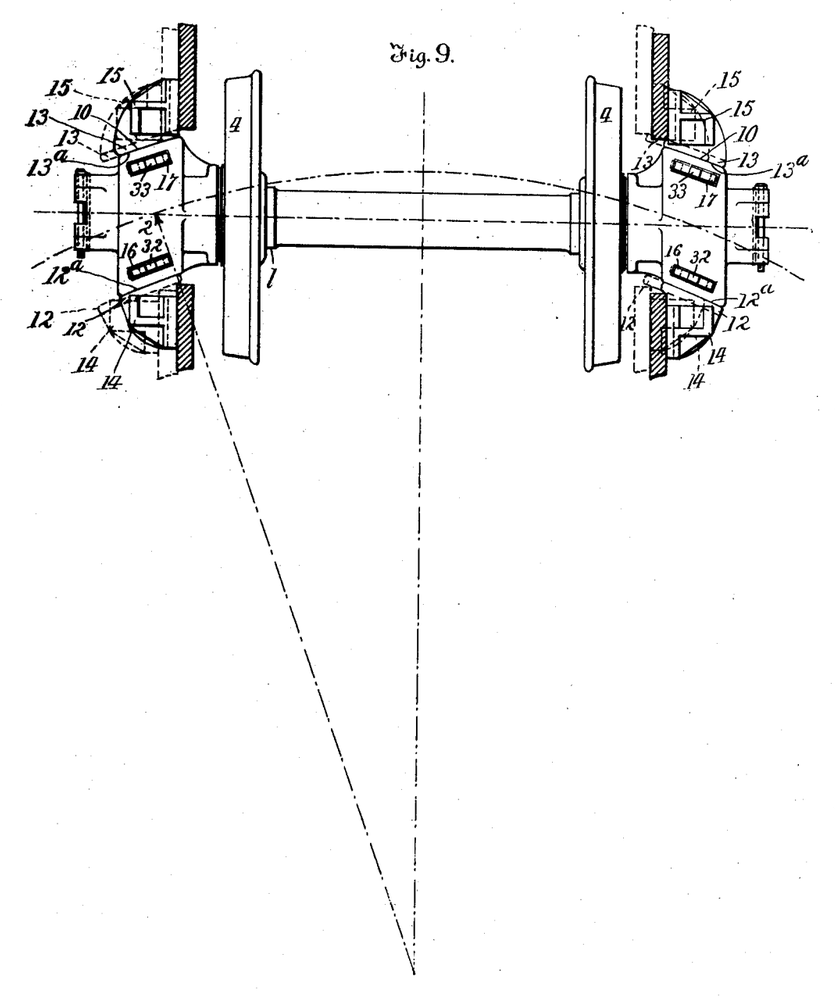
Fig. 9 is a plan view of a two wheeled truck provided with my invention, portions of the body frame being shown in horizontal section.

In order that the intention of my invention may be clearly understood I will point out briefly the conditions obtaining when an engine is traveling along a straight piece of track or rounding a curve. Reference should be had particularly to Figs. 7 and 8 in which $a^i$ $a^2$ indicate the wheels of the front or leading truck, $b'$ $b^2$ $b^3$ the driving wheels of the engine and $c$ the rear or back truck wheels; $d'$ $d'$ and $d^2$ $d^2$ indicating the rails and $e'$ $e'$ the center line of the engine. If the center line of the engine oscillates or is displaced to the position indicated by the dotted line $e^2$ $e^2$ it is evident that the resistance to lateral displacement of the rear truck coöperates with that of the front in tending to bring the engine back into position. It is also evident that, in rounding a curve while the lateral resistance of the front truck is pulling the corresponding end of the engine in the direction of the arrow 50, the strain of the rear truck is tending to pull the rear end of the engine in the opposite direction thus preventing the engine curving properly. The main feature of this invention as herein before described is the mechanism providing a resistance to the lateral movement of the truck with reference to the frame of the engine, (or vice versa), which is greatest at the commencement of the displacement, at which time considerable resistance is required to cause the engine to move steadily and which decreases as the displacement increases, thus offering as little resistance as desired when the displacement is great as on curves of small radii.

Figure 1:
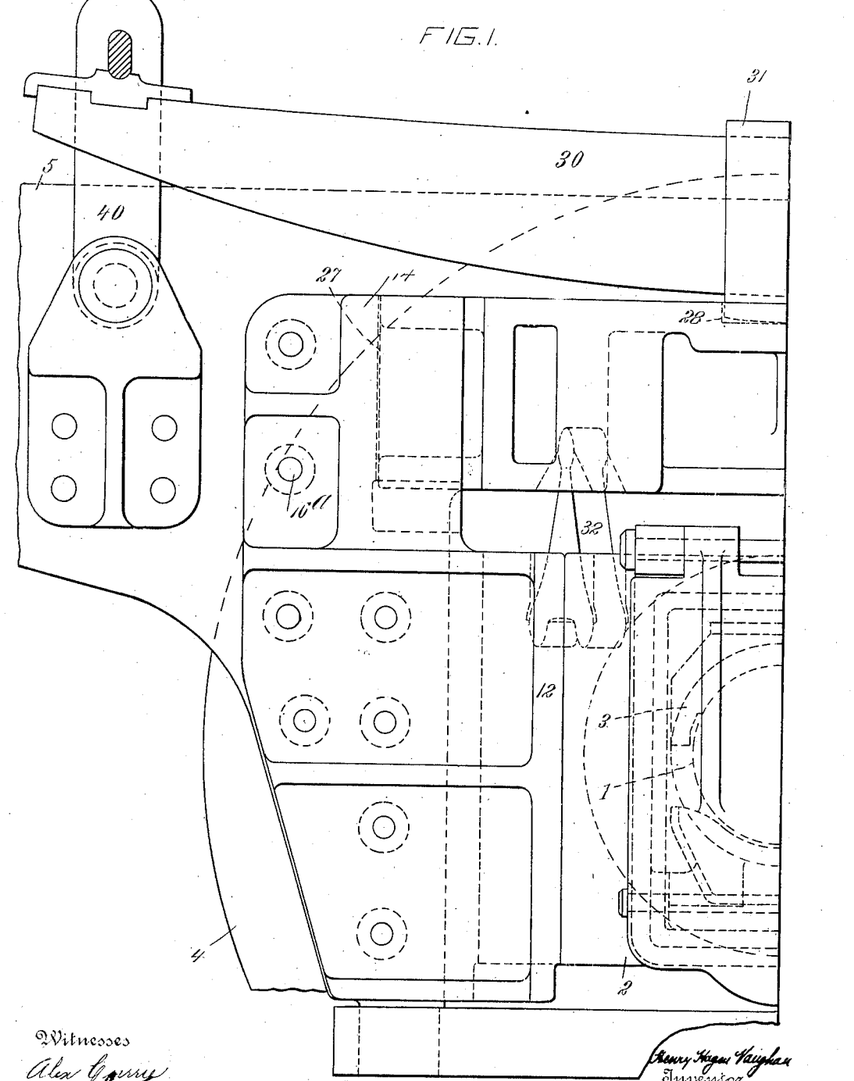
Figure 1 is a side elevation of one half of a journal bearing provided with my invention.
Figure 2:
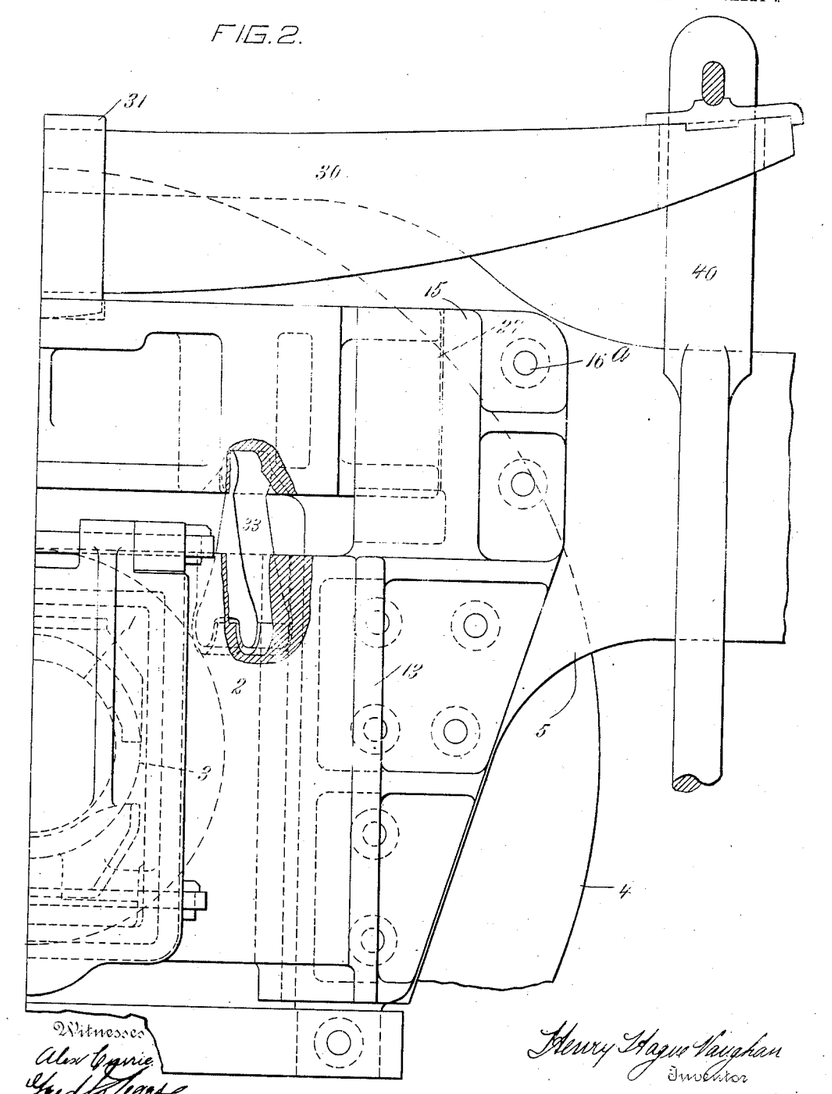
Fig. 2 is a similar view of the other half.
Figure 3:
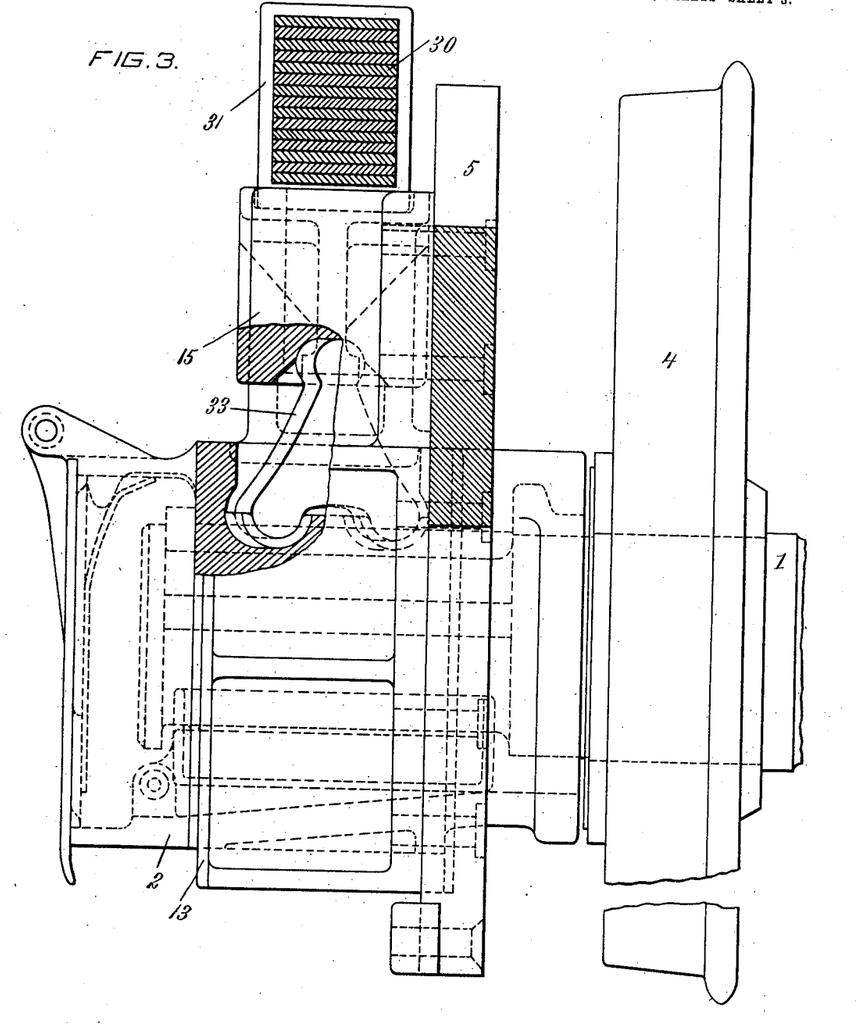
Fig. 3 is an end elevation of the bearing partly in section.
Figure 4:
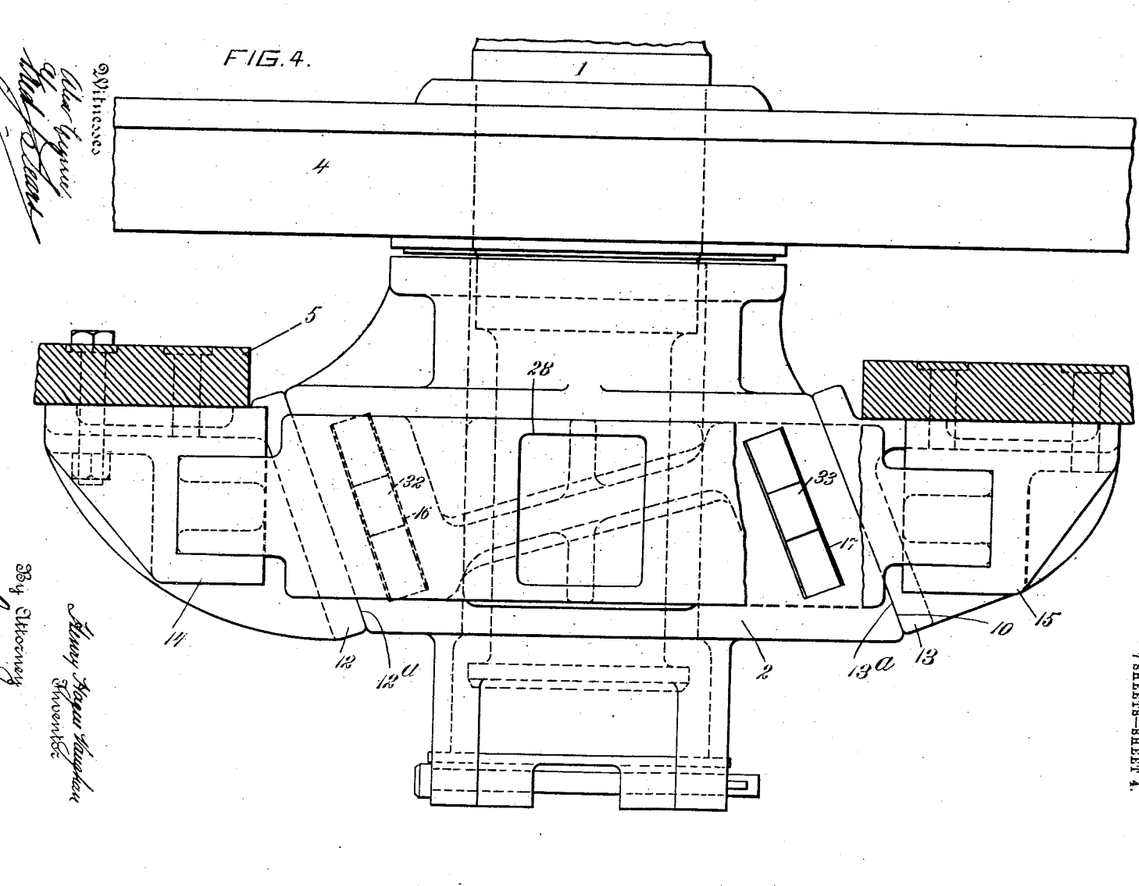
Fig. 4 is a plan view.
Figure 5:
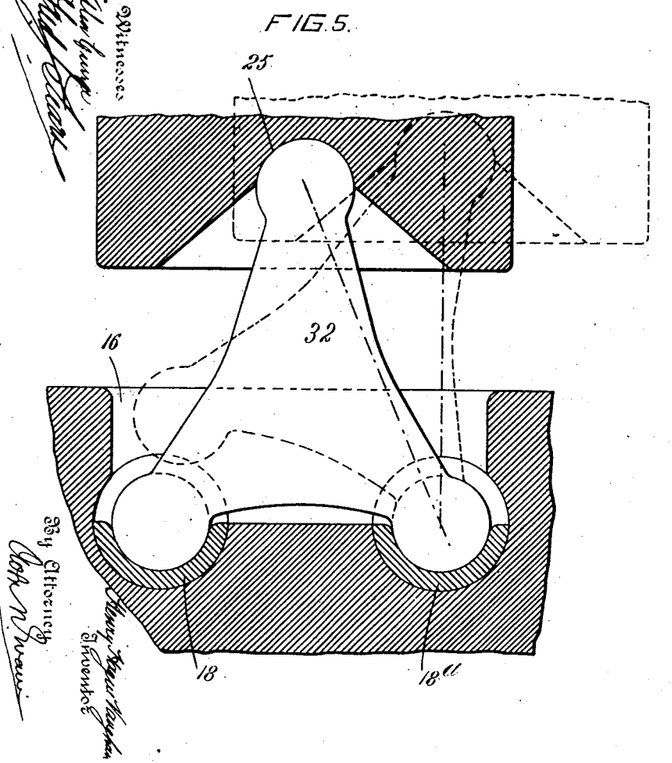
Figs. 5 and 6 are detail views of a pair of oscillatory triangular struts which are the primary means for affording the required varying resistance to the movement of the parts of the bearing relatively to one another.
Figure 6:
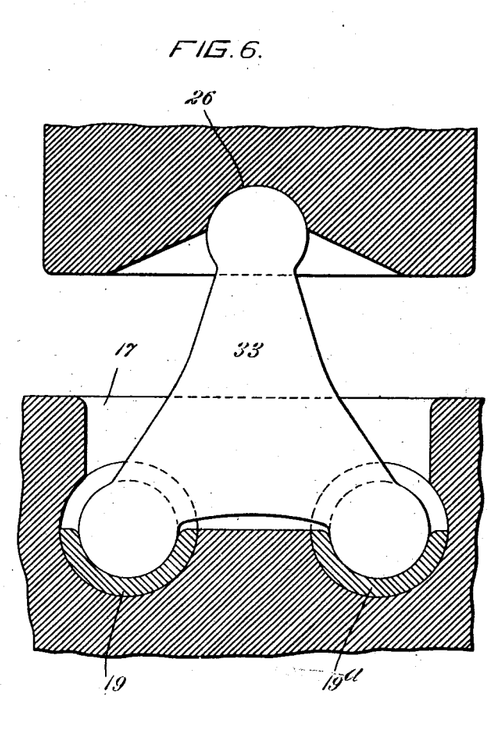

The action is as follows:—When any lateral displacement of the box takes place with relation to the frame, the axle, wheel, axle box, and contained parts, are moved (by the bearing relation of the curved faces 10 of the box to the corresponding faces 12ª and 13ª of the jaws 12 and 13) in a circular direction dependent on the radius to which these faces are formed. At the same time the sockets 18, 18ª and 19, 19ª in the box carry the lower portions or bases of the triangular struts with them and tend to rotate these struts upon their rounded apices which are retained by the sockets 25 and 26 against lateral displacement. If for instance, the wheel moves toward the portion of the frame indicated, (referring to Figs. 2 and 3) the sockets 18ª, 19ª are moved toward the sockets 18 and 19. It is evident that the instant movement takes place the weight transferred through the strut changes into a diagonal force tending to return the box into position. If the movement continues this diagonal force becomes more and more nearly vertical until when the sockets 18ª 19ª are vertically under the socket 25, 26 the horizontal component of the force has disappeared and the weight alone is transferred to the box.

It is evident that this construction provides a cross head permitted vertical movement only and which is utilized as an abutment to impress a lateral force on the axle box and I do not restrict myself to the specific mechanism shown by which this resistance is impressed.

The axle box illustrated constitutes to all intents and purposes a part of the truck. Each triangular strut presents a pair of strut-portions extending from the apex of the strut to the opposite ends of its base and constitute members which are normally inclined from the vertical, while each end of such base constitutes means for supporting the inclined member extending from the opposite end to the apex.

What I claim is as follows:—

1. In a vehicle the combination with the body frame and axle, one of such parts being displaceable relatively to the other, of means located between the said parts and offering to the movable part a resistance greatest when the said movable part is in its central position for the purpose set forth.

2. The combination of a laterally movable axle-box, a vertically movable cross-head, resistance mechanism in compression between the axle-box and cross-head, and guiding devices mounted independently of the axle-box and cross-head and adapted to guide the said parts in their respective movements.

3. The combination of a horizontally movable axle-box, a vertically movable cross-head, means in compression between the axle-box and cross-head offering a varying resistance to the horizontal movement of the axle-box relatively to the cross-head, and guiding devices mounted independently of the axle-box and cross-head and adapted to guide the said parts in their respective movements.

4. In a vehicle the combination with the body frame and truck thereof one movable laterally relatively to the other, of means in compression between the said frame and truck offering varying resistance to the said lateral movement, such resistance being greatest at the commencement of the displacement and decreasing as the displacement increases.

5. In a vehicle the combination with the body frame and truck thereof, one movable laterally relatively to the other, of a vertically movable member carried by one of the said parts, and an oscillatory strut bearing in compression between the other part and the movable member such strut being constructed and arranged to offer varying resistance to the movement of the movable part and greatest resistance when the said movable part commences to move, the said resistance diminishing as the movement increases.

6. In a vehicle the combination with the body frame and truck thereof, one movable laterally relatively to the other, of a vertically movable member carried by one of the said parts, and an oscillatory triangular strut bearing in compression between the other part and the movable member, for the purpose set forth.

7. In a vehicle the combination with the body frame thereof, of a vertically movable cross-head and a laterally movable axle box the ends of the latter presenting horizontally curved vertical bearing faces, concentric relatively to one another, means for guiding the cross-head and axle box in their respective movements, a pair of compression struts supporting the cross-head above the axle-box, means whereby each of the said struts are retained normally in a position inclined from the vertical toward the center line of the vehicle, for the purpose set forth.

8. In a vehicle the combination with the body frame thereof, of a vertically movable cross-head and a laterally movable axle box the ends of the latter presenting horizontally curved vertical bearing faces concentric relatively to one another, means for guiding the cross-head and axle box in their respective movements the underside of the said cross-head being formed with diagonal sockets and the top of the axle box being formed with correspondingly disposed recesses, each of such recesses being formed with a pair of sockets, a pair of triangular struts supporting the cross-head above the axle-box and presenting rounded angles, the apices of the said triangular struts bearing in the sockets in the underside of the cross-head and the rounded ends of the bases thereof bearing in the sockets of the said recesses, for the purpose set forth.

9. In a vehicle the combination with the body frame thereof, of a vertically movable cross-head and a laterally movable axle box the ends of the latter presenting horizontally curved vertical bearing faces concentric relatively to one another, a pair of guiding members mounted rigidly upon the body frame one at each end of the axle box and presenting curved jaws having the said curved faces of the axle box in bearing relation therewith, the said guiding members also presenting a pair of vertical guides adapted to receive the ends of the said cross-head and guide the same in its vertical movement, a pair of struts supporting the cross-head above the axle-box, means whereby each of the said struts is retained normally in a position inclined from the vertical toward the center line of the vehicle, for the purpose set forth.

10. In a vehicle the combination with the body frame thereof, of a vertically movable cross-head and a laterally movable axle box the ends of the latter presenting horizontally curved vertical bearing faces concentric relatively to one another, a pair of guiding members mounted rigidly upon the body frame one at each end of the axle box and presenting jaws curved concentrically to the said bearing faces and having the said curved faces of the axle box in bearing relation therewith the said guiding members also presenting a pair of vertical guides adapted to receive the ends of the said cross-head and guide the same in its vertical movement, the underside of the said cross-head being formed with diagonal sockets and the top of the axle box being formed with correspondingly disposed recesses, each of such recesses being formed with a pair of sockets, a pair of triangular struts supporting the cross-head above the axle-box and presenting rounded angles, the apices of the said triangular struts in the sockets in the underside of the cross-head and the rounded ends of the bases thereof bearing in the sockets of the said recesses, for the purpose set forth.

11. In a vehicle the combination with the body frame and truck thereof, one movable laterally relatively to the other, of means in compression between the said frame and truck and offering a varying resistance to the said movement such resistance being greatest when the parts are in their normal positions relatively to each other, the said means presenting a pair of members normally inclined in opposite directions and means supporting the same in their inclined positions.

In testimony whereof, I have signed my name to this specification, in the presence of two subscribing witnesses.

HENRY HAGUE VAUGHAN.

Witnesses:
  WILLIAM P. McFEAT,
  FRED J. SEARS.